Figure 1:
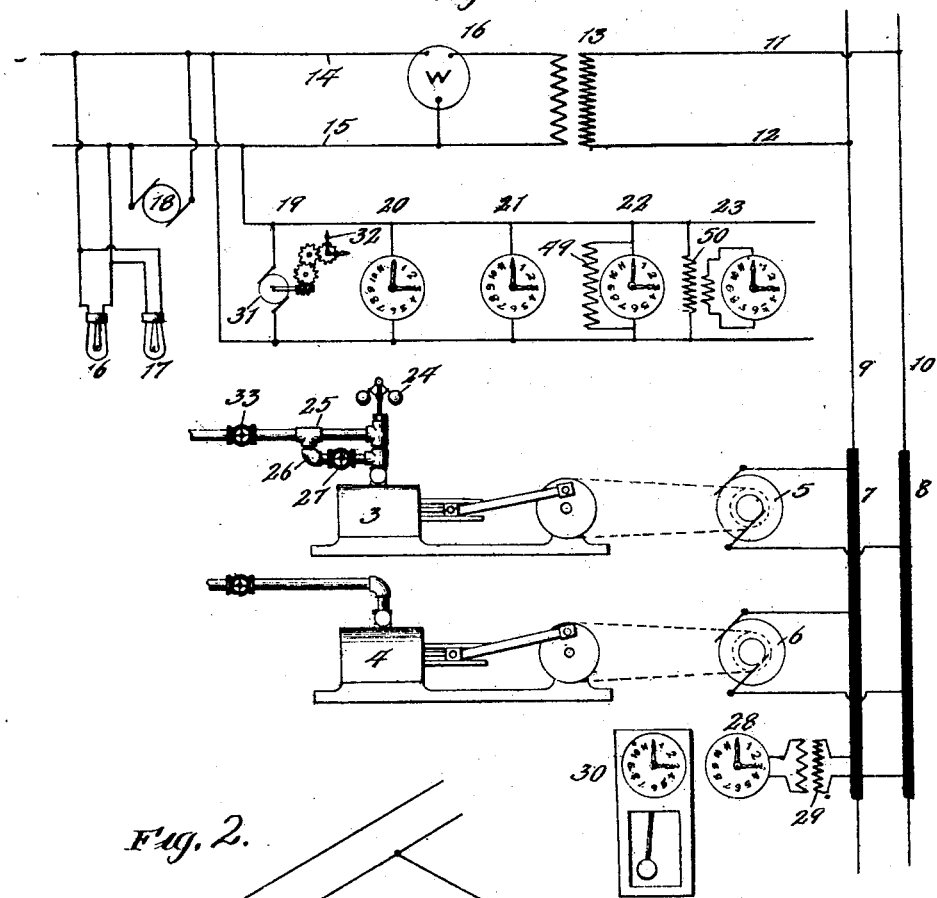

A. F. POOLE.
ELECTRIC CLOCK SYSTEM.
APPLICATION FILED SEPT. 12, 1914.

1,310,372.

Patented July 15, 1919.

Witnesses:

Inventor:
Arthur Poole

UNITED STATES PATENT OFFICE.

ARTHUR F. POOLE, OF CHICAGO, ILLINOIS.

ELECTRIC-CLOCK SYSTEM.

1,310,372.  Specification of Letters Patent.  Patented July 15, 1919.

Application filed September 12, 1914. Serial No. 861,360.

*To all whom it may concern:*

Be it known that I, ARTHUR F. POOLE, a citizen of the United States, residing at Chicago, in the county of Cook and State of Illinois, have invented certain new and useful Improvements in Electric-Clock Systems, of which the following is a specification.

My invention is an electric-clock system particularly adapted for use in connection with an electric light and power installation.

The principal object of my invention is to so modify the generating apparatus of the ordinary central station generating an alternating current that this modified current is adapted not only to distribute light and power through the territory served by the central station, but this current may also be used to distribute time; that is, to run a system of clocks which will be synchronized with a master clock at the central station. Central stations are ordinarily constructed having an alernating generator which generates current at a high potential, and which is run by a prime mover such as a steam engine, a steam turbine or a water turbine. The high-potential current thus generated is distributed over a network of wires to the various consumers, and usually at each consumer's station a transformer is provided to change this current of high potential into one of low potential. Also at the consumer's station an integrating wattmeter is provided to measure the amount of electric energy used by the consumer.

It is one of the objects of my invention to use all the apparatus above mentioned, which apparatus, it will be remembered, is required in connection with the light and power distribution, for the furnishing of a synchronized time service to the consumer. To this end, I provide means to synchronize the alternating current generator at the central station with a master clock. The alternating current generator at the central station is usually designed to generate an alternating current at sixty cycles per second. However, this frequency is usually approximate, since while the prime mover is provided with a governor, yet such governors are designed with a view of keeping the speed constant within one or two per cent. It is necessary to carry out my improved invention that while the speed of the generator is not absolutely constant, yet the total number of alternations sent out by the generator in a given period of time shall be constant. For instance, while in any second the generator may send out not sixty, but fifty-nine or sixty-one, impulses, it is necessary that during the course of an hour the total number of impulses sent out divided by the number of seconds in the hour shall equal exactly sixty.

Having premised a generator which in the long run sends out exactly sixty cycles per second, it is only necessary to provide a small synchronous motor, properly geared with reduction gearing to a pair of clock hands, in order that the consumer may have a time service at his station, for, obviously, the synchronous motor will reproduce the revolutions of the generator, since it will keep in step therewith, and if the revolutions of the generator be governed so that said generator sends out exactly sixty cycles per second, obviously, the clock at the consumer's station will keep time.

Having thus in a general way given an outline of my invention, I will now describe it with more particularity, referring to the accompanying drawings, of which,—

Figure 2:
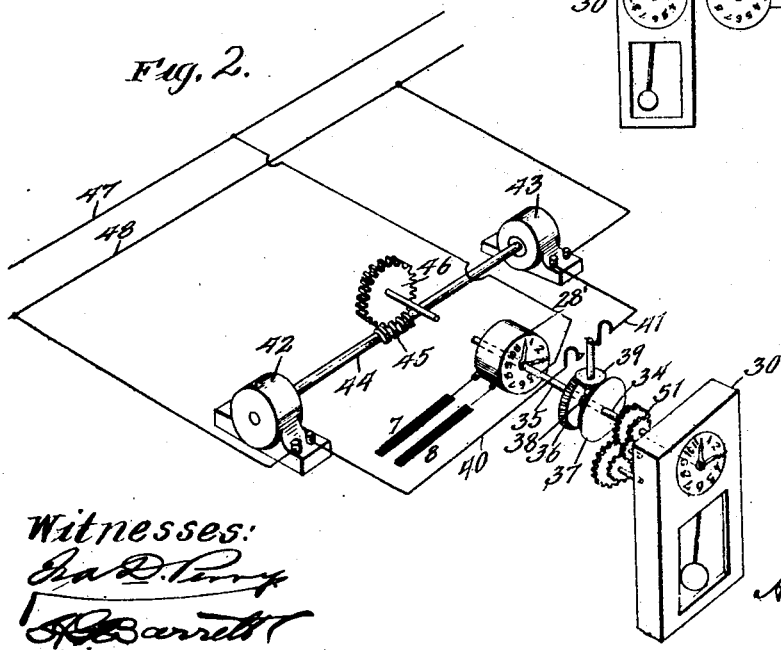

Figure 1 is a diagrammatic view of a central station, a system of distributing wires, and a consumer's station, showing thereat an assemblage of clocks, of electric lamps, a motor, and an integrating wattmeter to keep account of the electric energy consumed; and Fig. 2 is a diagrammatic view of my method for bringing the generator in synchronism with a master clock.

It must be borne in mind that these views are merely diagrammatic, since the individual pieces of apparatus required to carry out my invention are well known in the art; my invention consisting in the new combination which I have made of these old elements for the purpose described.

Referring to Fig. 1, there are shown two prime movers 3 and 4, which in this case have been diagrammatically shown as reciprocating steam-engines, although, as before mentioned, any other form of prime mover may be used. Connected to the prime movers are alternating current generators 5 and 6 connected to the bus bars 7 and 8. These bus bars are connected to the line wires 9 and 10, and, at a desired point, a branch line 11 and 12 is taken off for a consumer. The customary transformer 13 transforms the high-potential current of the generator into a potential suitable for use in a house. From the transformer 13 extend service lines 14 and 15, and there is an integrating wattmeter 16 in circuit therewith, for the purpose of keeping account of the electric energy used by the consumer. Connected to the service wires 14 and 15 are a pair of lamps 16 and 17, also an electric motor 18, and a set of secondary clocks 19, 20, 21, 22 and 23.

Returning to the apparatus at the central station, it will be seen that, in Fig. 1, the prime mover 3 is provided with a centrifugal governor 24 controlling the admission of the steam to the engine, and thereby its speed. Steam is supplied through a pipe 25 from a suitable boiler not shown, and connected to the pipe 25 is a by-pass 26 having a valve 27 for the purpose of changing the speed of the engine independently of the governor. At the central station, a pilot clock 28 is connected to the bus bars 7 and 8 by means of a suitable transformer 29. A master clock 30 is provided at the central station.

Returning to the secondary clocks at the consumer's station, at 19 is shown a diagrammatic view of the mechanism of a secondary clock. This mechanism consists of a small synchronous motor 31, which is geared by suitable reduction gearing to the clock hands 32. I have shown this reduction gearing merely in diagrammatic form, since it is well within the skill of the ordinary mechanic to gear a synchronous motor to a shaft so as to make one revolution of this shaft correspond to 60 multiplied by 60 multiplied by 60, or 216,000 cycles. As before stated, if the generator is by any means made to give out exactly sixty cycles per second, in one hour it will give out 216,000 cycles, and therefore the problem is to gear a motor to the hand such that 216,000 cycles sent through the motor will correspond to one revolution of the hand. This hand, of course, would be the minute hand of the clock. The hour hand is connected therewith by suitable reduction gearing. The clock 19 and the clock 28 are similarly constructed. We will consider for a moment the clock 19, the clock 28 and the master clock 30. Obviously, if the generator 5 has not been running at the required speed, the clock 28 will not indicate the same time as the master clock 30; but these two clocks can be brought into synchronism by the manipulation of either the auxiliary valve 27 in the by-pass 26, in case the clock 28 is behind the clock 30, showing that the generator has not run fast enough; or by manipulation of the main steam valve 33 in the steam pipe 25, in case the clock 28 is faster than the master clock 30, showing that the generator has sent in too many cycles during the hour, and therefore needs its speed reduced in order to bring the clocks 30 and 28 into synchronism. The secondary clocks 19, 20, 21, 22 and 23, and all other secondary clocks on the system, will of course keep in step with the pilot clock 28; so that, as far as I have at present described my improved system, the secondary clocks may be kept in synchronism with the master clock by the simple expedient of having an attendant at the central station manipulate the source of power driving the prime mover, and thereby bring the pilot clock 28 into synchronism with the master clock 30, all the secondary clocks on the system being brought into synchronism at the same time.

While this manual control of the source of power for the prime mover may be used, and my system worked in this manner, yet it will be more advantageous to use the automatic governing scheme for the generator diagrammatically shown in Fig. 2. Referring to this figure, we see that the master clock 30 has a shaft 34 connected thereto, and this shaft, being connected to the clock movement, will rotate a given number of revolutions per hour. However, a reversing gear 51 is placed between the shaft 34 and the clock movement itself, with the object of reversing the movement of the shaft 34 relative to the hands of the clock 30. At 28' is a pilot clock, and to this pilot clock is connected a shaft 35, which is geared to have its rate of revolution as compared to the hands of said pilot clock 28' the same as the rate of revolution of the shaft 34 to the hands of the master clock 30. The shafts 34 and 35 are connected to opposite sides 36 and 37 of a differential gear mechanism 38, and the central portion 39 of this differential gear is adapted to engage one or the other of two contacts 40 and 41. These contacts are part of a circuit including motors 42 and 43 connected to the same shaft 44 on which is a worm 45 which is adapted to move a wheel 46, which is connected to the throttle of the prime mover, the ordinary governor present in such prime mover being dispensed with. The motors 42 and 43 are connected to sources of power 47 and 48, and are so connected that the motor 42 will run in the opposite direction from the motor 43. The rate of revolution of the shaft 35 is of course proportional to that of the generator. The rate of revolution of the shaft 34 is proportional to that of the master clock or to the correct time. If these two rates should not be exactly equal to each other, the center 39 of the differential gear will be displaced. Suppose that the shaft 35 is revolving faster than the shaft 34, thereby indicating that the generator is running too fast. The center of the differential gear will then be displaced to contact with the terminal 41 and thus start the motor 43.

Revolution of this motor and consequent revolution of the shaft 44 will turn the throttle wheel 46 and shut off steam from the prime mover. Accordingly, the shaft 35 will diminish its speed, and as soon as the speed of the shaft 35 is less than the speed of the shaft 34, the center 39 will be separated from the terminal 41, and the motor 43 will stop. In case the shaft 35 should turn slower than the shaft 34, the center 39 will be displaced to make contact with the terminal 40. This will start the motor 42 into rotation, and thereby turn the throttle wheel 46 in the opposite direction, admitting more steam to the prime mover, and the speed of the shaft 35 will increase.

It will be seen from the above description that the action of the center 39 on the terminals 40 and 41 will keep the number of revolutions of the shaft 35 exactly equal to the number of revolutions of the shaft 34. The very fact of the shaft 35 going ahead or lagging behind the shaft 34 will bring into effect the instrumentalities of the motors 42 and 43 which will operate to correct such a defect.

While I have shown the shafts 34 and 35 as connected to the minute hands of the respective clocks 30 and 28', this is merely for the diagrammatic purpose of showing my improved method of bringing the prime mover into synchronism with the master clock, and many variations of my precise scheme will be evident to those who are skilled in the art.

It is evident that the master clock 30, if the shaft 34 is driven directly therefrom, must be of a type in which the power applied to the escapement is independent of the power driving the clock. Clocks of this kind are well known in the art, since the problem is essentially the same as has been already solved for the particular case of a tower clock by the employment of a gravity escapement. A plan which may also be adopted has been disclosed by me in my Patent No. 1,084,661, dated January 20, 1914, in which an electric motor drives a shaft at a rate which is determined by a master clock.

Considering for a moment the secondary clocks, particularly those numbered 22 and 23, the clock at 22 is provided with a shunt circuit 49. This is for the purpose of providing a small additional load to the clock. It may be that the consumption of the synchronous motor 31 of the clock 22 is not sufficient to justify the owners of the generating station in furnishing power. In other words, the normal load of the clock may be entirely too small to make it a profitable enterprise to supply energy thereto. An artificial load may be very easily put on, such as the shunt 49, thus bringing the cost of the clock per month to the consumer to any desired rate. I have shown the clock at 23 connected to the circuit by means of a small transformer 50. In some cases this may be desirable, on account of the voltage in the consumer's station not being suitable to run the synchronous motor used for actuating the clock.

I wish to call attention to the fact that while I have shown a large central station installation, the frequency of the current sent out is exactly the same at any of the substations as it is at the central station. Therefore my invention may be used to great advantage in the case of a large hydro-electric installation, in which the power generated at a waterfall is distributed over a wide territory. The frequency at any point supplied from the main generating station is exactly the frequency of the generating station itself. Therefore, governing the frequency of the generating station is all that is necessary to enable one to supply a time service over a large area.

I also call attention to the fact that, in Fig. 1, I have shown two generators 5 and 6 connected to the bus bars for the purpose of bringing out the fact that it is necessary to govern only one prime mover of a number of generators connected to the same bus bars, since, if any generator starts to get out of phase with the generator connected to the governed prime mover, such a generator will automatically bring itself back into phase. Therefore it will probably be necessary, even in a large installation, to synchronize only one of the generators with the master clock. This would automatically keep the balance of the generators at that station in synchronism.

One very important aspect of my invention is the employing of the usual apparatus at a generating station and the usual network of wires and meters, all of which are needed for the production and sale of light and power, for the purpose of supplying an additional source of revenue to the central station, namely, that derived from the sale of time. Take, for example, the case of a central station serving an entire city. All that it would be necessary for this station to do in order to supply time at any place where it was already supplying electric light would be to bring its generators at the central station into synchronism with a master clock. One could then attach a secondary clock, consisting of the small synchronous motor, as above described, at any place on this entire system, and this clock would reproduce the time of the master clock. I also wish to call attention to the fact that the supplying of this time service would entail no additional load on the accounting system of the central station, since the power necessary to run these secondary clocks would all go through the integrating wattmeter present in every installation, and would be registered on said meter. The cost to the consumer of his time service would be therefore somewhat in the nature of an indirect tax. He would know that his light bills had increased a small trifle, but he would not be able to locate this increase as due to his having one of these secondary clocks on his premises. This feature, viz., that of having the charge for the time service lumped in with the regular charge for light and power, I consider of very great advantage, since it avoids altogether the necessity for any separate system of accounts for the time service.

In some installations, particularly hydroelectric installations, the electric power is generated at the main station and is there transformed into a current of very high potential and transmitted to various substations, or, as they are sometimes called, transformer stations, located at various points in the locality to be served. The high potential current sent over the line wires is transformed into a current of low potential at these substations and distributed to the various consumers. At the consumers' stations the current is again transformed into a current of low potential suitable for use at the consumers' stations. Except for the case of transforming an alternating current into a direct current, these various transformations are done by means of static transformers, and therefore the frequency at any consumer's station is the frequency of the generator at the main plant, notwithstanding the various transformations which have been made in the current before it is used by the consumer. From what has been said before, it is obvious that all that is necessary to supply time over a large territory supplied by a hydro-electric installation is to synchronize the generator at the main station with a master clock. Connecting one of my improved secondary clocks to any place on this circuit will result in the secondary clock keeping correct time. My system is therefore adapted to distribute time over a very large area. The reason for this is that I employ for my time system instrumentalities which are necessary for the distribution of light and power, and it is only necessary for me to synchronize the prime mover, as hereinabove pointed out, in order that one may use a secondary clock at any point in the territory served by the power plant.

Many changes and variations may be made in the invention herein disclosed without departing from the spirit thereof, since I claim:

1. In a system of distribution, the combination with an alternating-current generator and translating devices connected to the system, of a synchronous motor connected to the system, and clock hands connected to the motor to be continuously actuated thereby to indicate time, said generator being adapted to supply energy to the translating devices and the motor clock.

2. A system for distributing time indications comprising a commercial alternating-current system, a standard clock, a comparison clock the hands of which are driven synchronously with the alternations through suitable gearing to run at the rate of the standard clock when the frequency is normal, secondary clocks driven by synchronous motors and means for adjusting the frequency of the system.

3. A system for distributing time indications comprising a commercial alternating-current system, a standard clock, a comparison clock the hands of which are driven synchronously with the alternations through suitable gearing to run at the rate of the standard clock when the frequency is normal, secondary clocks driven by synchronous motors and means for automatically adjusting the frequency of the system to cause the hands of the comparison clock to run in synchronism with the standard clock.

4. In a system for distributing time, the combination with a commercial alternating-current load circuit and a generator therefor, of a synchronous motor operatively connected to the load circuit, clock hands actuated continuously by the motor to indicate time, and means for controlling the frequency of the generator to cause it to be substantially constant.

5. In a system for distributing time, the combination with a commercial alternating-current load circuit and a generator therefor, of a synchronous motor operatively connected to the load circuit, clock hands actuated continously by the motor to indicate time, and means for so controlling the generator that its frequency averages a predetermined value through its period of operation.

6. In a system for distributing time, the combination with a commercial alternating-current generator, of a synchronous motor operatively connected thereto, clock hands actuated directly by the motor, and a master clock disposed adjacent the clock hands to indicate the deviation of the generator from its proper generated frequency.

7. In a commercial alternating-current system, the combination with a generator, of a synchronous motor connected to the system near the generator for indicating time, and a master clock disposed adjacent the synchronous motor for facilitating the comparison of the time as indicated by the synchronous motor and the master clock.

8. In a commercial alternating-current system, the combination with a generator, of a synchronous motor connected to the system near the generator for indicating time, and a master clock disposed adjacent the synchronous motor to indicate the deviation of the synchronous motor clock from the master clock.

9. In an electric clock system, the combination with a prime mover, an alternating-current generator driven thereby, a master clock, and a synchronous motor connected to the generator, of a differential gear mechanism connected between the master clock and the motor for controlling the speed of the prime mover.

10. In an electric clock system, the combination with a prime mover, an alternating-current generator driven thereby, a master clock, and a synchronous motor clock connected to the generator, of a differential gear mechanism connected between the master clock and the synchronous motor clock for controlling the speed of the prime mover.

11. A timing device comprising time-indicating means directly coupled with a synchronous motor responsive to an alternating current whose frequency is sufficiently high to be used for commercial lighting.

12. The combination with a commercial alternating-current circuit, of a synchronous motor connected thereto, and time-indicating means directly coupled to the motor.

13. The combination with a commercial alternating-current circuit, of a synchronous motor connected thereto, and time indicating means directly geared to the motor.

14. The combination with a commercial alternating-current circuit, of time-indicating means, and means whereby the indicating means are actuated in continuous synchronism with the current traversing the circuit.

15. The combination with a commercial alternating-current circuit, of time-indicating means, and a synchronous motor so connected between the indicating means and the circuit that the indicating means are actuated in continuous synchronism with the current traversing the circuit.

16. The combination with a commercial alternating current lighting circuit, of a synchronous motor connected thereto, clock hands, and means for so connecting the clock hands to the motor that they are actuated in continuous synchronism with the current traversing the circuit.

17. The combination with a commercial alternating-current circuit, of a clock having a time element driven directly by a synchronous motor included in said circuit, and a master clock with which said clock may be compared.

18. The combination with a commercial alternating-current circuit, of a clock having a time element driven directly by a synchronous motor included in said circuit, a master clock, and differential means connected between said clocks whereby the frequency of the current traversing the circuit is maintained substantially constant.

In witness whereof, I have hereunto signed my name, this 10th day of September, 1914.

ARTHUR F. POOLE.

Witnesses:
 IRA D. PERRY,
 JULIA M. BRISTOL.